Dec. 23, 1924.  E. G. FLANNERY ET AL  1,520,540
STAY BOLT FOR BOILERS
Original Filed Feb. 1, 1923
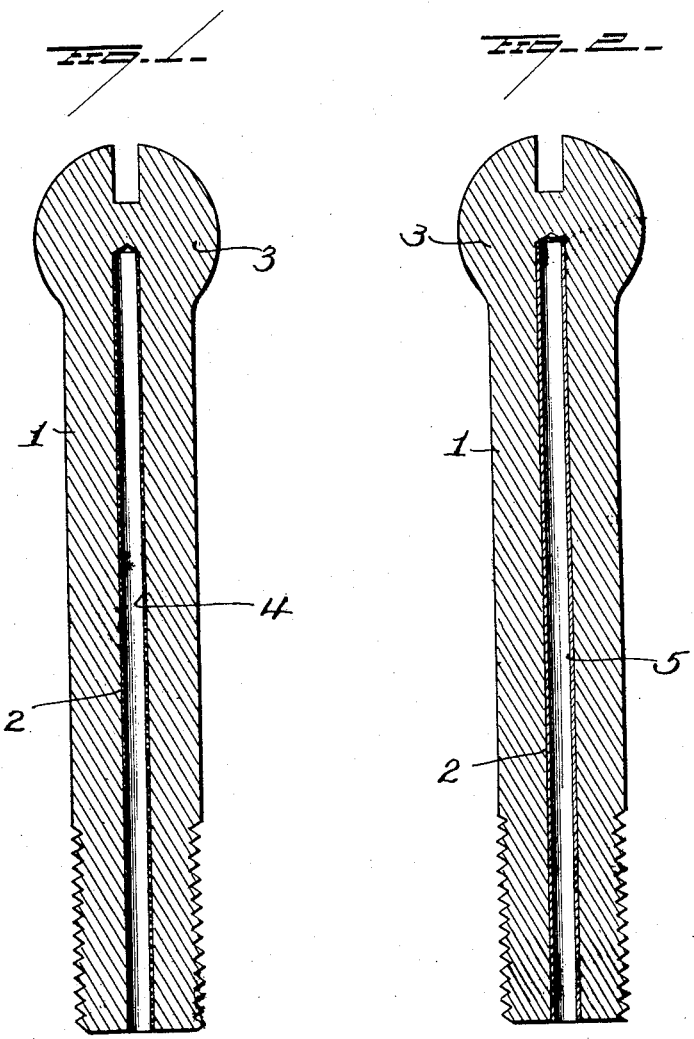

Patented Dec. 23, 1924.

1,520,540

UNITED STATES PATENT OFFICE.

EUGENE G. FLANNERY AND GROVER R. GREENSLADE, OF PITTSBURGH, PENNSYLVANIA, ASSIGNORS TO FLANNERY BOLT COMPANY, OF PITTSBURGH, PENNSYLVANIA.

STAY BOLT FOR BOILERS.

Application filed February 1, 1923, Serial No. 616,395. Renewed October 14, 1924.

*To all whom it may concern:*

Be it known that we, EUGENE G. FLANNERY and GROVER R. GREENSLADE, citizens of the United States, and residents of Pittsburgh, in the county of Allegheny and State of Pennsylvania, have invented certain new and useful Improvements in Stay Bolts for Boilers; and we do hereby declare the following to be a full, clear, and exact description of the invention, such as will enable others skilled in the art to which it appertains to make and use the same.

This invention relates to improvements in staybolts for boilers.

Heretofore, it has been customary to construct staybolts for boilers of ferrous metal, such as iron, and to provide the bolts with openings known in the art as telltale holes or bores. In some instances, the telltale openings extend partially through the bolt, axially thereof, and in other instances, such openings which provide telltale holes extend from the inner end of the bolt approximately to but not through the outer end of the bolt where the head is formed. Where the bolts are provided at their outer ends with heads (which is the more prevalent construction), the telltale holes terminate within such heads. When the bolts are made of iron (which is the usual practice), difficulty has been caused from the rusting of the wall of the telltale hole, such rusting resulting in the accumulation of sufficient solid particles within the telltale hole, to clog the latter to a greater or less extent and thus impair the accurate functioning of the telltale hole to give to the inspector, reliable and unmistakable information as to the exact condition of the bolt.

The object of our present invention is to provide efficient means in a staybolt, which will prevent rust or corrosion of the wall of the telltale hole and the accumulation of solid particles incident to such rust or corrosion.

With this object in view, the invention consists in certain features, in the combination of a staybolt, as hereinafter set forth and pointed out in the claims.

In the accompanying drawings,—

Figure 1 is a sectional view of a staybolt exemplifying our invention, and

Figure 2 is a similar view showing another way of effecting the object of our invention.

The staybolt 1 is provided with a telltale hole 2 which, in the construction shown in the drawings, extends from the inner end of the bolt approximately to but not through the outer end thereof,—said telltale hole terminating within the head 3 of the bolt. The wall of the telltale hole is insulated against contact of moisture therewith so as to prevent oxidation of the iron wall of the hole, and thus to prevent the accumulation of solid particles within the hole, resulting from rust or corrosion. This insulation may consist of a coating 4 on the wall of the telltale hole and such coating may be an electro-plating of said wall with metal which will not be chemically or otherwise affected by moisture in a manner to produce rust or corrosion. Such a metal for coating the wall of the telltale hole in an iron bolt might be copper. Instead of coating the wall of the hole by a plating, said wall may be insulated for the purpose specified, with the use of lacquer, paint, varnish or other like material.

The object of our invention might also be attained by providing the wall of the telltale hole with a lining member which may be inserted into said hole. For example, a tube of thin copper or other non-ferrous metal or material may be inserted into the telltale hole so as to line or cover the wall of said hole as indicated at 5 in Figure 2.

Having fully described our invention what we claim as new and desire to secure by Letters-Patent, is:

1. A staybolt for boilers having a telltale hole extending from one end of the bolt axially thereof, said hole having its other end closed, at least the end wall of said hole at said closed end thereof being rust or corrosion proof.

2. A staybolt for boilers having a telltale hole extending from one end of the bolt axially thereof, said hole having its other end closed, and means protecting at least the end wall of said hole at said closed end thereof against rust or corrosion.

3. A ferrous staybolt for boilers, having a telltale hole, and a non-ferrous covering for the wall of said hole to insulate said wall from contact of any corrosive or rust-forming substances.

4. A staybolt having a telltale hole, and means in said hole to prevent rust or corrosion, said means consisting of an insulating covering for the wall of said telltale hole.

5. A staybolt for boilers, having a telltale hole, the wall of said hole having a protective coating.

6. A staybolt for boilers, having a telltale hole, and material contacting with the wall of said telltale hole to prevent contact of moisture with said wall.

7. A staybolt for boilers, having a telltale hole, the wall of said hole being plated with a substance other than that of which the bolt is composed to prevent rust or corrosion.

8. A staybolt having a telltale hole, and means in said hole to prevent rust or corrosion in any portion thereof.

In testimony whereof, we have signed this specification in the presence of two subscribing witnesses.

EUGENE G. FLANNERY.
GROVER R. GREENSLADE.

Witnesses:
F. H. ALLISON,
MAURICE COSTELLO.